Oct. 24, 1967     P. J. SHERRINGTON ETAL     3,348,938
PROCESS FOR PRODUCING GRANULAR MIXED FERTILIZER
Filed April 15, 1964

INVENTORS
PETER J. SHERRINGTON
PETER WATERHOUSE
DANIEL J. H. JONES
BY Cushman, Darby & Cushman
ATTORNEYS United States Patent Office 3,348,938
Patented Oct. 24, 1967

3,348,938
PROCESS FOR PRODUCING GRANULAR
MIXED FERTILIZER
Peter John Sherrington, Peter Waterhouse, and Daniel John Howard Jones, Norton-on-Tees, England, assignors to Imperial Chemical Industries Limited, London, England, a corporation of Great Britain
Filed Apr. 15, 1964, Ser. No. 364,330
3 Claims. (Cl. 71—28)

This invention relates to the production of mixed fertilizers.

According to the present invention there is provided a continuous process for the production of granular mixed fertilizers which comprises feeding recycled product obtained as hereinafter described to a mixer, such as for example a blunger, together with solid fertilizer raw material if desired, and introducing into the mixer a melt, aqueous slurry or solution of fertilizer substance containing up to 25% by weight of water, forming therein by agglomeration or by agglomeration and layering granules which contain little water, transferring said granules to a rotary drier provided with lifting flights, preferably having an initial propelling section, passing a stream of hot gas through the drier co-currently with the general direction of flow of the granules, causing the granules to cascade in the hot gas through the agency of the lifters and spraying into the drier by means of one or more nozzles situated near the inlet end of the drier, a solution or slurry of a fertilizer substance or substances so that granules become coated with the liquid and become dried in such manner that enlarged coated granules are formed, taking off enlarged granules which are substantially free from moisture from the drier, sieving them to obtain a product of a desired grading and recycling to the mixer the undersize and crushed oversize with, if desired, some of the product which may also be crushed. For convenience, the term liquid may be employed to describe a melt, a slurry or a solution.

Figure 1:
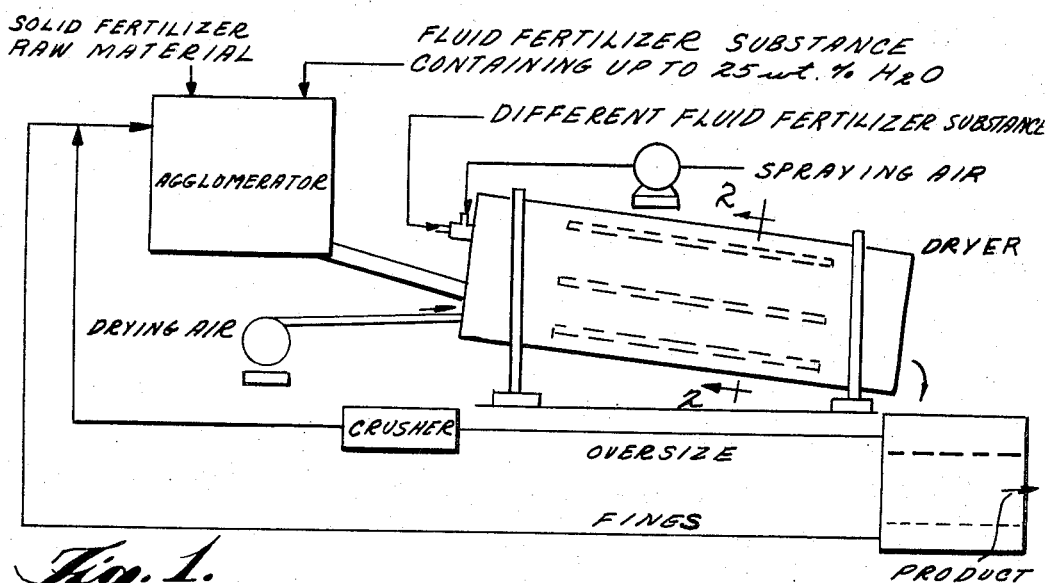
FIGURE 1 is a flow sheet of the process showing the preferred equipment in schematic form.

In this process the layer applied by spraying in the drier is always of a different composition from the granules leaving the blunger.

In the production of concentrated NPK or NP fertilizers it has been common practice hitherto to introduce the nitrogen and phosphate constituents to a granulator in which they are formed into granules in the presence of water and to pass these granules through a drier. In that process it is usual to introduce the nitrogen and phosphate constituents to the granulator as solutions or slurries. Consequently a large proportion of the raw material entering the granulator has been in liquid form and it has been necessary to recycle a large amount of dried material in order to decrease the moisture content of the material in the granulator to a level giving efficient granulation. According to the present invention, unlike the previous process, all or part of one, or part of two or more, of the components entering the process as solutions or slurries is introduced into the inlet end of the drier. This affords the advantages that there is a considerably decreased recycle load and consequently an increased output from the plant, and also that over-all drying is facilitated through removal of some moisture from the sprayed droplets, and some flash drying of the thin sprayed outer layer on the granules.

As indicated, one of the merits of the invention is that it allows of operation with generally a much lower recycle of material to granulation than in traditional processes, for example a ratio, recycled material: finished product of 2–5:1 by weight as compared with e.g., 5–12:1 (usually operated in order to obtain layering at higher than 5:1). The process has especial advantage in relation to NPK fertilizers based on ammonium nitrate, ammonium phosphate and potassium compounds, e.g., muriate of potash (60% $K_2O$) which contain at least 20% of ammonium phosphate and at least 30% of ammonium nitrate, because water balances favourable to granulation, on the one hand, and to spraying and drying on the other, are readily obtained along with a small recycle of product and flexible operation. Examples of such fertilizers are 2:1:1 fertilizers, for example 22:11:11.

The process can also be applied to NP fertilizers in which there are at least the aforesaid proportions of ammonium phosphate and ammonium nitrate.

It can also be applied to NPK fertilizers based on urea, ammonium phosphate and potassium compounds, e.g., muriate of potash which contain at least 20% of ammonium phosphate and at least 25% of urea by weight, for example 2:1:1 fertilizers.

Solutions or slurries suitable for introducing into the blunger contain from 0.5% to 25% by weight of water, e.g., ammonium phosphate containing from 8% to 25% of water, say 15% of water, and ammonium nitrate solutions or melts with from 0.5% to 10% preferably, not more than 5% of water. If mixed ammonium nitrate/ammonium phosphate slurries are used their water content should preferably be in the range of 4% to 12% by weight. With urea slurries or solutions a suitable water content is from 0.5% to 10% by weight.

The preferred component for spraying into the drier is ammonium phosphate. This may comprise mixed mon-ammonium/di-ammonium phosphates, for example having an N:P atom ratio of 1.6:1. Very good results are obtained by spraying into the drier a slurry which contains from 10% to 15% of water by weight. This procedure confers the benefit that it affords a coating of ammonium phosphate which is less liable to cake than ammonium nitrate and so the anti-caking properties of the granules are improved.

The free moisture content of the material leaving the granulator is preferably less than 2% but may be higher, e.g., up to about 4% by weight. The lower it is the better the operating conditions in the drier. In the blunger a large proportion of the granules is formed by agglomeration although some layering occurs there. In the case of the 22:11:11 fertilizer made from ammonium nitrate ammonium phosphate, and muriate of potash grading less than B.S.S. 10 and such that 92% was less than B.S.S. 36 and 30% less than B.S.S. 100, 50% and more by weight of the granules ex the blunger had been formed there by agglomeration (estimated on the basis of examination by auto radiography of cross-sections of numerous granules; optical microscopy; and X-ray micro-radiography).

While rotary drums may be used as granulators it is preferred to use mixers which have moving mixing elements, e.g., paddle mixers and twin bladed paddle mixers, because of the improved uniformity of mixing.

Paddle mixers comprise a D-section body, which may be horizontal or inclined in which rotates, e.g., at 40 r.p.m. an axial shaft provided with radial arms which may be bladed. Another suitable form of mixer is a twin bladed paddle mixer sometimes called a blunger, which comprises a trough-shaped vessel in which rotate two axial shafts provided with a number of blades arranged so that the blades of one shaft are staggered longitudinally relatively to those on the other for effective mixing.

The invention, although of wider application, will now be illustrated as applied to the production of a 2:1:1 $N:P_2O_5:K_2O$ fertilizer made from potassium chloride, (60% $K_2O$), ammonium nitrate and mixed mono- and diammonium phosphate (N:P ratio: 1.6:1), which contains 44 plant food units.

Figure 2:
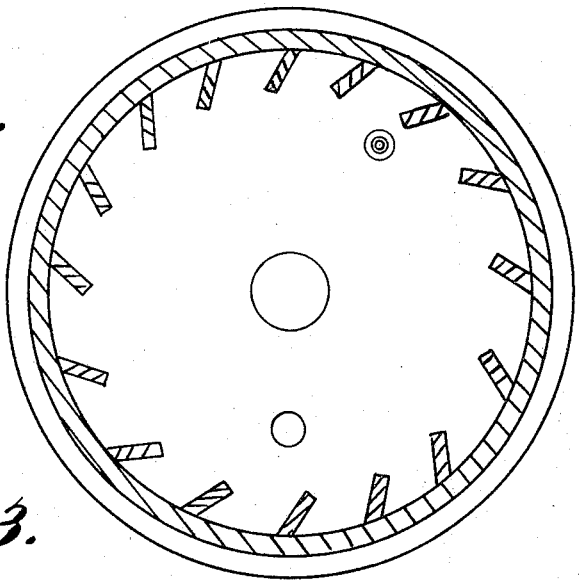
FIGURE 2 is a sectional view taken on the line 2—2 of FIGURE 1.

Granules are formed in the blunger by feeding to it solid potassium chloride, recycled material of less than 2 mm. comprising crushed oversize and fines amounting to about $5x$ (weight of finished product) per hour, and through a pipe, an aqueous solution, e.g., of 95% concentration, of ammonium nitrate at 150° C. The resulting granules containing about 0.7% moisture are fed directly to the drier through which is passed a co-current stream of drying air at an inlet temperature of the order of 150° C. to 170° C. (It is important that the air flow be co-current in order substantially to prevent agglomeration in the drier.) A slurry of the aforesaid mixed mono- and di-ammonium phosphates containing about 20% of water and at about 105° C. to 120° C. is sprayed in through a spray nozzle whose nose is located close to the inlet end of the drier. With the drier rotating at about 8 r.p.m. the spray is preferably situated, as shown in FIGURE 2, at the inlet to the drier at a point which may be defined relatively to the cross section of the drier, viewed from its inlet end, as on a radius situated at 25°–30° to the right of the vertical centre line and about two-thirds of the way along that radius measured from the centre, when the drier as viewed from the inlet end is rotating anti-clockwise.

Figure 3:
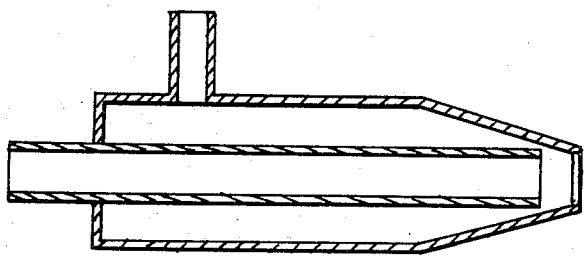
FIGURE 3 is a fragmentary sectional view, on an enlarged scale, showing the spray nozzle of FIGURE 1.

Various types of spray nozzle may be used but, as shown in FIGURE 3, the most effectual from the viewpoint of decreasing build-up of slurry on the spray face and minimising chocking has a inner tube to which the magma is pumped under pressure, surrounded by an annular tube to which air is fed under pressure and preferably has a conical nose. Preferably, the magma, air, and drying gas, are all about the same temperature.

The product from the drier contains about 0.3% of moisture and a typical grading is as follows:

| | Percent by weight |
|---|---|
| Greater than 4 mm. | 20 |
| Product (2–4 mm.) | 18 |
| Less than 2 mm. | 62 |

The crushed oversize and undersize, together with 2–4 mm. product, if desired, are recycled to the blunger.

The above product granules have less tendency to cake than would be expected, requiring about half of the anti-caking agent (china clay) used for fertilizers of similar composition, made by the usual process, viz. granulating in a blunger followed by drying in a separate drier. This is believed to be due to a relatively thin coat of ammonium phosphate protecting the underlying ammonium nitrate based mixture which has greater caking tendency. Thus a 22:11:11 fertilizer in the form of 1.5 to 3.5 mm. granules made according to the present invention and coated with 2% by weight of china clay behaved distinctly better than the same granular fertilizer made by the conventional process and coated with 4% by weight of china clay, when tested after four month's storage under a forty high bag stack by dropping a bag once and examining the condition of the fertilizer. The former was of acceptable commercial standard, the latter was not.

In the above process the following modifications may be made.

Only a small proportion of the ammonium phosphate slurry is sprayed into the drier.

Alternatively, a high proportion of the ammonium phosphate is sprayed into the drier and the mesh size of the fines is increased to increase layering or coating in the blunger, with concomitant increase in the amount of material recycled to the blunger.

*Example*

This illustrates application of the process to the production of a 22:11:11 NPK fertilizer from ammonium nitrate, ammonium phosphate, and muriate of potash (60% $K_2O$).

There were fed per hour to a blunger: 190 kgs. of muriate of potash; 5000 kgs. of recycled product, fines and crushed oversize; and 378 litres of 95% ammonium nitrate liquor. The resulting granules at 80–85° C. were passed continuously to a rotary drier, 4′ diameter x 39′ long, provided with a 3′ propelling section and twenty four flights or lifters, through which air at an inlet temperature of 200° C.–210° C. was passed at a rate of 3000 cubic metres per hour measured at 760 mm. and 20° C. A slurry with an N:P ratio of 1.6:1 prepared by mixing and reacting 142 litres of phosphoric acid (50% $P_2O_5$), 70 litres of water and 64 cubic metres of ammonia gas at 760 mm. and 20° C. per hour and evaporatively cooling to a water content of 12%–14% of water by weight, was sprayed into the drier at a temperature of 115° C.–120° C. through a twin fluid spray having a head of conical section using atomising air heated to within 5° C. of the liquor temperature situated in an atmosphere at about 190° C.–200° C. The spray was located at the beginning of the propelling section in the manner already described and the slurry was fed to the nozzle under pressure by a centrifugal pump. The solids exit temperature was 85° C.–90° C. and the gas exit temperature 90° C.–95° C.

6000 kgs. per hour of granules having a moisture content of 0.2%–0.25% by weight were taken off from the drier, which on sieving yielded: 2000 kgs. of 1.5–4 mm. granules, of which 1000 kg. was taken to store and 1000 kg. was recycled; and 4000 kgs. of a mixture of fines and washed oversize which was also recycled.

We claim:
1. A continuous two-step process for producing granular mixed fertilizer comprising: continuously introducing into an agglomerating zone finely divided recycled product obtained as hereinafter described and a fertilizer substance containing up to 25% water by weight; agitating the recycled product and fertilizer substance in the agglomerating zone to agglomerate the same into granules having low water content; continuously removing the granules from the agglomerating zone and continuously transferring them to a coating zone; coating and drying the granules in the coating zone without effecting further agglomeration by cascading them through a stream of hot gas and by simultaneously spraying them with a liquid fertilizer substance of different composition from the granules to thereby form enlarged granules substantially free of moisture; continuously removing the enlarged granules; sieving the removed granules to obtain a product of desired grading; and recycling to the agglomerating zone the undersize and crushed oversize particles.

2. Process as in claim 1 wherein said first fertilizer substance contains from 0.5% to 10% by weight of water and comprises a fertilizer substance selected from the group consisting of ammonium nitrate and urea.

3. Process as in claim 1 wherein said second fertilizer substance contains from 8% to 25% by weight of water and comprises a fertilizer substance selected from the group consisting of ammonium phosphate and mixed monoammonium/diammonium phosphate.

References Cited

UNITED STATES PATENTS 2,926,079   2/1960   Smith _____ 71—64

HOWARD R. CAINE, *Acting Primary Examiner.*

S. LEON BASHORE, *Examiner.*

R. BAJEFSKY, *Assistant Examiner.*